United States Patent
Costantini et al.

[11] 3,923,895
[45] Dec. 2, 1975

[54] PREPARATION OF CYCLOALKANONES AND CYCLOALKANOLS

[75] Inventors: Michel Costantini; Noel Crenne, both of Lyon; Michel Jouffret, Francheville-Le-Bas; Jacques Nouvel, Lyon, all of France

[73] Assignee: Rhone-Poulenc S.A., Paris, France

[22] Filed: May 14, 1971

[21] Appl. No.: 143,472

[30] Foreign Application Priority Data
May 15, 1970 France.............................. 70.17837

[52] U.S. Cl.......................... 260/586 P; 260/631 R
[51] Int. Cl.[2].................... C07C 49/30; C07C 35/08
[58] Field of Search......... 260/586 B, 631 R, 617 F, 260/617 H

[56] References Cited
UNITED STATES PATENTS

| | | | |
|---|---|---|---|
| 2,609,395 | 9/1952 | Dougherty et al.................. | 260/586 |
| 2,675,407 | 4/1954 | Gallo et al.......................... | 260/586 |
| 3,093,686 | 6/1963 | Simon et al......................... | 260/586 |

FOREIGN PATENTS OR APPLICATIONS
777,087  6/1957  United Kingdom

OTHER PUBLICATIONS
Chem. and Eng. News, Apr. 21, 1958, pp. 56 & 57.

*Primary Examiner*—Donald G. Daus
*Assistant Examiner*—D. B. Springer
*Attorney, Agent, or Firm*—Cushman, Darby & Cushman

[57] ABSTRACT

A process for the continuous preparation of a mixture of a cycloalkanone and cycloalkanol by oxidation of a cycloalkane in the liquid phase by means of a gas containing molecular oxygen, followed by heating the resulting solution of cycloalkyl hydroperoxide in the corresponding cycloalkane, at 80°–150°C. in the presence of a soluble chromium derivative as a catalyst, wherein at least a part of the heating of the hydroperoxide solution is carried out in the presence of a monoester or diester of ortho-phosphoric acid which is soluble in the reaction medium. The presence of the phosphate ester prevents buildup of a deposit on the walls of the dehydroperoxidation reactor.

3 Claims, 1 Drawing Figure

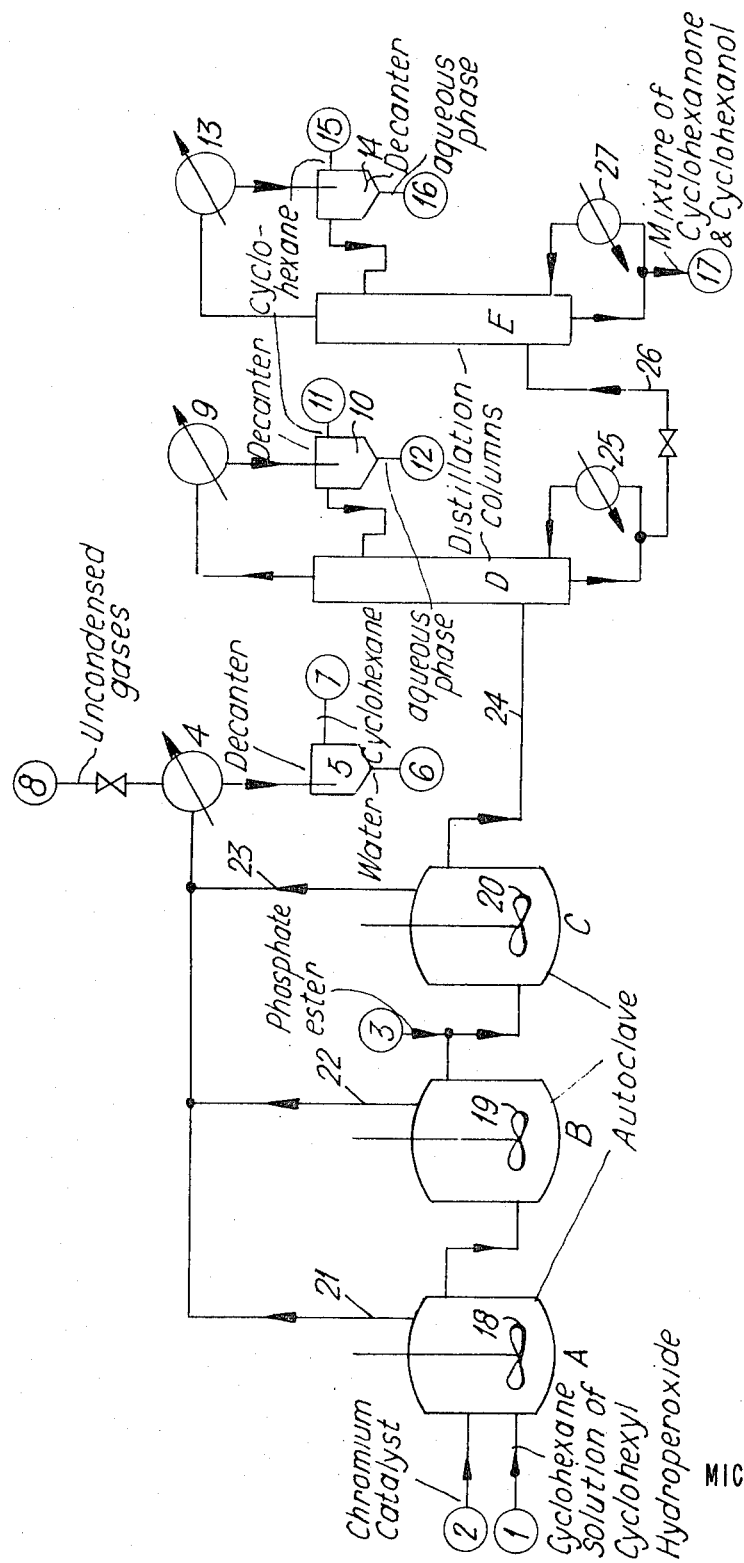

PREPARATION OF CYCLOALKANONES AND CYCLOALKANOLS

The present invention relates to the continuous preparation of mixtures of cycloalkanones and cycloalkanols and in particular to an improvement in the continuous treatment of oxidation products containing hydroperoxides, obtained by the oxidation of cycloalkanes with molecular oxygen.

Processes for the preparation of mixtures of cycloalkanones and cycloalkanols by oxidation of a cycloalkane by means of molecular oxygen, in which the decomposition of the resulting hydroperoxides is effected in a separate stage from the oxidation stage, have already been described.

Thus United Kingdom Patent Specification No. 777,087 has proposed oxidising cyclohexane with air in the presence of soluble catalysts derived from cobalt or chromium, and then heating the oxidation mixture without supplementary addition of catalyst so as to decompose the cyclohexyl hydroperoxide into derivatives which can yield adipic acid by subsequent oxidation.

U.S. patent Application Ser. No. 814,082 now abandoned in favour of a continuing application, Ser. No. 333,374 filed Feb. 16, 1973 describes oxidising a cycloalkane in the liquid phase by means of a gas containing molecular oxygen, and then heating the resulting solution of cycloalkyl hydroperoxide in the corresponding cycloalkane, in the liquid phase, at between 80° and 150°, in the presence of a soluble chromium derivative as the catalyst, the process being carried out in several successive stages effected in distinct reaction zones arranged in series, in each of which the hydroperoxide concentration is kept at a practically identical value at all points of the zone.

In carrying out the processes for the decomposition of the cycloalkane hydroperoxides continuously by heating in the presence of a soluble chromium derivative, it is found that if the hydroperoxide content of the reaction medium becomes low, the surfaces of the apparatus in contact with this medium ultimately become covered with an insoluble product which reduces the heat exchanges across the walls.

The present invention provides an improvement which makes it possible to minimise or even eliminate this disadvantage. The present invention provides a process for the continuous preparation of a mixture of a cycloalkanone and cycloalkanol by oxidation of a cycloalkane in the liquid phase by means of a gas containing molecular oxygen, followed by heating the resulting solution of cycloalkyl hydroperoxide in the corresponding cycloalkane, at 80°–150°C, in the presence of a soluble chromium derivative as a catalyst, wherein at least a part of the heating of the hydroperoxide solution is carried out in the presence of a monoester or diester of orthophosphoric acid which is soluble in the reaction medium.

Amongst the ortho-phosphate esters which can be used in the process are those of general formula:

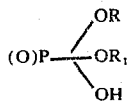

(1)

where R represents a hydrocarbon radical having 1 to 18 carbon atoms and $R_1$ represents a hydrogen atom or a $C_1$–$C_{18}$ hydrocarbon radical. The radicals R and $R_1$ can be identical or different. It is preferred to use esters of formula (I) in which at least one of the radicals R or $R_1$ has more than 3 carbon atoms.

The symbol R can, for example, represent an alkyl radical such as methyl, butyl, heptyl, octyl, dodecyl or octadecyl, a cycloalkyl radical such as cyclohexyl, cyclododecyl or methyl, an aryl radical such as tolyl or an aralkyl radical such as phenylethyl.

Specific ortho-phosphate esters which can be used include mono- or di-(n-butyl) ortho-phosphate, mono- or di-(n-heptyl) ortho-phosphate, mono- or di-(2-ethylhexyl) ortho-phosphate, mono- or di-(n-dodecyl) ortho-phosphate, mono- or di-(n-octadecyl) ortho-phosphate, monomethyl-monobenzyl ortho-phosphate, monoethyl-monotolyl ortho-phosphate, monomethyl ortho-phosphate and mono(n-dodecyl)monocyclohexyl ortho-phosphate.

It is possible to use either one ester of formula I or a mixture of esters of formula (I).

The ortho-phosphate ester (I) is generally used in an amount such that it introduces from 0.5 to 2.5 gram atoms of phosphorus per gram atom of chromium introduced in the form of catalyst; the preferred amounts correspond to proportions ranging from 0.8 to 2 gram atoms of phosphorus per gram atom of chromium.

The improvement of the invention is particularly applicable to the process described in U.S. patent application Ser. No. 814,082 now abandoned in favour of a continuing application, Ser. No. 333,374 filed Feb. 16, 1973. In this case, the ortho-phosphate ester is generally introduced into a reaction zone which still contains at least 5% of the initial amount of hydroperoxide. If the installation includes one or more deperoxidation zones located in the boilers of concentration columns or distillation columns, it is preferable to introduce the ortho-phosphate ester into the reaction mixture upstream from these columns and, of the zones located in this way, to introduce it into that zone which contains the proportion of hydroperoxide which is closest to 5%, relative to the initial amount.

Examples of the multiple deperoxidation zones are as follows:

EXAMPLE A

An apparatus is used comprising three stainless steel recycling columns designated as columns A, B and C. Each of the columns is in the shape of a cylinder (of height 178 cm. and internal diameter 5 cm.) provided with a coaxial internal cylinder (internal diameter 3 cm.) having a useful capacity of 3.1 liters, and is equipped with an external jacket containing a heating fluid at 123° C. These columns are arranged in a cascase.

A pre-concentrated cyclohexane solution at 95° C. originating from the oxidation of cyclohexane by air without a catalyst and containing, after concentration, 10.8% of peroxides, 2.43% of cyclohexanol, 1% of cyclohexanone and 3.35% of products of low volatility consisting principally of acids and esters, is introduced into the base of the column A at the rate of 13.5 kg/hour. At the bottom of each column nitrogen is introduced at the rate of 100 l/hour and, an 0.03% strength solution in cyclohexane of chromium octoate containing 10.8% by weight of metal is introduced at the rate of 0.8 kg/hour for columns A and B and 0.48 kg/hour for column C. Inside each column the temperature is 115° C. and the pressure 2.5 bars (relative).

The nitrogen and the products carried over (water, cyclohexane, cyclohexanol, cyclohexanone) issuing from the upper part of each of the columns are passed to the condenser. The condensed products are passed to the decanter which allows the water to be separated and the organic phase, while the uncondensed gases are removed.

The liquid phase which overflows from column C is cooled to 40°C, expanded to atmospheric pressure and washed in counter-current, together with the organic phase separated from the decanter, in a column fed with an 8% strength aqueous ammoniacal solution at the rate of 4 kg/hour; the aqueous phase is removed while the organic phase is introduced into a plate column D which simultaneously ensures the decomposition of the residual peroxides and the removal of the greater part of the cyclohexane.

At its bottom this column is provided with a boiler which keeps the liquid at the bottom at a temperature of 115° C. The vaporized fraction (cyclohexane and water) is condensed and then collected in the decanter which separates the cyclohexane and the aqueous phase.

The mixture of products of low volatility is collected and distilled.

The amounts of peroxides, cyclohexanol and cyclohexanone present at different stages of the process for 100 kg. of the solution introduced are indicated below:

|  | Peroxides kg | Cyclohexanone kg | Cyclohexanol kg |
| --- | --- | --- | --- |
| Solution to be treated | 10.8 | 1 | 2.43 |
| on issuing from A | 5.55 | 4.21 | 3.41 |
| on issuing from B | 2.43 | 5.67 | 3.80 |
| on issuing from C | 1.51 | 5.94 | 4.08 |
| on issuing from D | 0 | 6.75 | 3.76 |

EXAMPLE B

This apparatus comprises three stainless steel recycling columns A, B and C. Each column is in the shape of a cylinder (of height 260 cm and internal diameter 5 cm) provided with a coaxial internal cylinder (internal diameter 3 cm.) having a useful capacity of 3.1 liters, and is equipped with an external jacket containing a heating fluid at 105° C. These columns are arranged in a cascade.

At the bottom of column A there is introduced at the rate of 9.64 kg/hour, a cyclohexane solution at 100° C. originating from the oxidation of cyclohexane by air without a catalyst, which has been washed in counter-current with water (10% of its weight) and then dried by distillation of the water-cyclohexane azeotrope. This solution contains, by weight, 9.8% of peroxides, 2.76% of cyclohexanol, 1% of cyclohexanone and 1% of products of low volatility consisting mainly of acids and esters.

At the bottom of each column nitrogen is also introduced at the rate of 200 l/hour, while an 0.0825 strength solution of t-butyl chromate in cyclohexane is introduced at the rate of 0.312 kg/hour for each of columns A, B and C.

Inside each column the temperature is 105° C. and the pressure 2.6 bars (relative). At the upper part of each column the nitrogen and the products carried with it (essentially water and cyclohexane) are condensed and the condensed products are decanted allowing the water to be separated while each of the organic phases is returned to the bottom of the corresponding column. The uncondensed gases are removed after expansion. The liquid phase which overflows from column (C) is expanded to atmospheric pressure at the bottom of a plate column (D) which simultaneously provides for the decomposition of the residual peroxides and the removal of the greater part of the cyclohexane. At the bottom this column (D) is provided with a boiler which maintains the liquid at 110° C. The vaporized fraction (cyclohexane and water) is condensed and then collected in the decanter which separates the cyclohexane and the aqueous phase.

The mixture of products of low volatility is collected and distilled. The amounts of peroxides present at different stages of the process per 100 kg of solution fed in is given below:

solution to be treated : 9.8
on issuing from A : 4.33
on issuing from B : 1.66
on issuing from C : 0.53
on issuing from D : 0

After 98 hours continuous operation an average hourly production of 764 g. of cyclohexanone and 457 g. of cyclohexanol was obtained.

The Example which follows illustrates the invention.

EXAMPLE

The apparatus used, shown schematically in the accompanying drawing, comprises three autoclaves A, B and C each having a useful capacity of 4 litres connected together in a cascade arrangement, and equipped with an axial rotating stirrer 18, 19 and 20 and an external jacket (not shown) containing a fluid maintained at 96°C.

A cyclohexane solution obtained by oxidation of cyclohexane with air in the absence of a catalyst, the said oxidation having been followed by a concentration process and a wash with water, is introduced into autoclave A through inlet (1) at the rate of 24.4 kg/hour. The cyclohexane solution introduced hourly contains 1450 g. of cyclohexyl hydroperoxide, 466 g. of cyclohexanol, 173 g. of cyclohexanone and products of low volatility consisting principally of acids and of esters.

A cyclohexane solution containing 0.44% of t.-butyl chromate is also introduced into autoclave A, through line (2), at a flow rate of 0.240 kg/hour.

In autoclave C, where the reaction mixture still contains 8.8% of the amount of hydroperoxide introduced at (1), a cyclohexane solution containing 0.68% by weight of mono(2-ethylhexyl) o-phosphate is introduced through line (3) at the rate of 0.240 kg/hour.

Inside each autoclave, the temperature is 95°C. and the relative pressure is 0.4 bar.

The vapourised products (water and cyclohexane) which issue from the upper part of each autoclave through lines 21, 22 and 23 are passed to a condenser (4); the condensed products are passed to a decanter (5), which makes it possible to separate off the water at (6) and the cyclohexane at (7), whilst the uncondensed gases are removed at (8).

The liquid phase which overflows from the autoclave C is passed through line 24 to the base of a plate column D which simultaneously provides for the decomposition of a part of the residual peroxides and the partial elimination of the cyclohexane. This column is equipped, at its base, with a boiler 25 which keeps the liquid at a temperature of 102°C. The vapourised fraction (cyclohexane-water) is condensed in condenser (9) and then received in a decanter (10) which separates off the cyclohexane at (11) and the aqueous phase at (12). The preconcentrated liquid phase which has issued from the base of the column D is passed through line 26 to a second plate column E equipped with a boiler 27 which keeps the liquid at its base at a temperature of 120°C. This column simultaneously ensures the decomposition of the residual peroxides and the elimination of the greater part of the cyclohexane. The absolute pressure in the column E is 350 mm of mercury. The vapourised fraction is condensed at condenser (13) and separated in decanter (14) into cyclohexane which is recovered at (15) and aqueous phase which is recovered at (16).

The mixture on non-volatile products is collected at (17) and distilled, which yields 1160 g. of cyclohexanone and 790 g. of cyclohexanol hourly.

After running for 2000 hours, no deposit was detected on the walls of the apparatus in contact with the liquid organic medium.

The cyclohexane solution introduced into the autoclave A was obtained by oxidation of cyclohexane without a catalyst at 170°–180°C, using air in which the oxygen content had been reduced to 14% by volume, the process being carried out under a pressure of 18 bars and the yield of products of low volatility being 4.8%. After concentration, the solution was washed in counter-current with water at 90°C. used at the rate of 5% by weight.

We claim:

1. In a process for the continuous preparation of a mixture of cyclohexanone and cyclohexanol by oxidation of cyclohexane in the liquid phase by means of a gas containing molecular oxygen, followed by heating the resulting solution of cyclohexyl hydroperoxide in cyclohexane, at 80°–150° C. in the presence of a soluble chromium catalyst, the improvement which comprises carrying out at least a part of the heating of the hydroperoxide solution in the presence of a monoester of diester of orthophosphoric acid which is soluble in the reaction medium and which has the formula:

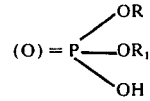

in which R represents a hydrocarbon selected from the group consisting of alkyl, cycloalkyl, aryl and aralkyl having up to 18 carbon atoms and $R_1$ represents a hydrogen atom or a hydrocarbon selected from the group consisting of alkyl, cycloalkyl, aryl and aralkyl having up to 18 carbon atoms, R and $R_1$ being the same or different, at least one of R and $R_1$ having more than three carbon atoms, and wherein the amount of orthophosphate ester used is such that it introduces 0.5 to 2.5 gram atoms of phosphorus per gram atom of chromium introduced in the form of a catalyst.

2. A process according to claim 1, wherein the orthophosphate ester is mono-(2-ethylhexyl)-ortho-phosphate.

3. A process according to claim 1, wherein a solution of mono-(2-ethylhexyl)ortho-phosphate in cyclohexane is introduced into a dehydroperoxidation zone maintained at a temperature of about 95° C and a pressure of about 0.4 bar and the reaction product issuing from the dehydroperoxidation zone is distilled to remove cyclohexane and water and to leave a distillable residue of cyclohexanone and cyclohexanol.

* * * * *